United States Patent
Askarpour

(10) Patent No.: US 9,470,550 B2
(45) Date of Patent: *Oct. 18, 2016

(54) METHOD OF CALIBRATING A HEADING REFERENCE SYSTEM

(71) Applicant: Innovative Solutions & Support, Inc., Exton, PA (US)

(72) Inventor: Shahram Askarpour, Media, PA (US)

(73) Assignee: Innovative Solutions & Support, Inc., Exton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/881,114

(22) Filed: Oct. 12, 2015

(65) Prior Publication Data

US 2016/0033302 A1 Feb. 4, 2016

Related U.S. Application Data

(63) Continuation of application No. 13/833,513, filed on Mar. 15, 2013, now Pat. No. 9,157,747.

(51) Int. Cl.
| | |
|---|---|
| *G01C 5/00* | (2006.01) |
| *G01C 25/00* | (2006.01) |
| *G01C 17/38* | (2006.01) |
| *G01C 21/20* | (2006.01) |

(52) U.S. Cl.
CPC ............ *G01C 25/00* (2013.01); *G01C 17/38* (2013.01); *G01C 21/20* (2013.01)

(58) Field of Classification Search
CPC ...... G01C 17/02; G01C 17/28; G01C 17/30; G01C 17/32; G01C 17/38; G01C 21/165; G01R 33/0035; G01R 33/025; G01R 33/0206; G01V 3/08; G01V 3/081; G01V 3/087; G01V 3/15; G01V 3/16; G01V 3/165; G01V 3/17; G01V 3/175; G01D 18/00; G01D 18/002; G01D 18/008

See application file for complete search history.

(56) References Cited

U.S. PATENT DOCUMENTS

| | | | | |
|---|---|---|---|---|
| 4,031,630 A | * | 6/1977 | Fowler ................... | G01C 17/38 33/356 |
| 4,091,543 A | * | 5/1978 | Lapeyre ................. | G01C 17/38 33/356 |
| 4,143,467 A | * | 3/1979 | Erspamer ............... | G01C 17/38 33/356 |
| 4,347,730 A | * | 9/1982 | Fisher .................... | G01C 17/38 702/93 |
| 4,797,841 A | * | 1/1989 | Hatch .................... | G01C 17/38 324/245 |
| 4,870,602 A | * | 9/1989 | Baumker ............... | G01C 17/38 324/245 |

(Continued)

*Primary Examiner* — Thomas Tarcza
*Assistant Examiner* — Richard Goldman
(74) *Attorney, Agent, or Firm* — Bryan Cave LLP

(57) ABSTRACT

A method of calibrating a vehicle's heading system, such as the attitude heading and reference system of an aircraft or the heading system of a ship, positioned along the Earth's surface involves obtaining both actual and theoretical readings for the magnetometer of the heading system, and comparing these values to obtain calibration values for the heading system which are then averaged to obtain a universal average gain and offset for the magnetometer. The vehicle may be repositioned, such as to North, South, East, and west magnetic headings, with the procedure repeated at each of these headings, and the calibration values averaged, further increasing the accuracy.

9 Claims, 1 Drawing Sheet

Hard Iron Calibration Flow Diagram

(56) References Cited

U.S. PATENT DOCUMENTS

| | | | | |
|---|---|---|---|---|
| 5,170,354 A * | 12/1992 | Ueno | G01C 17/38 | 33/356 |
| 5,182,514 A * | 1/1993 | Rice, Jr. | G01V 3/165 | 324/244 |
| 5,297,065 A * | 3/1994 | Cage | G01C 17/38 | 33/356 |
| 5,672,967 A * | 9/1997 | Jensen | G01R 33/04 | 324/247 |
| 5,682,335 A * | 10/1997 | Assous | G01R 33/025 | 33/318 |
| 5,761,094 A * | 6/1998 | Olson | G01C 17/38 | 324/202 |
| 6,161,062 A * | 12/2000 | Sicre | G01S 3/48 | 340/974 |
| 6,282,803 B1 * | 9/2001 | Dunne | G01C 17/38 | 324/253 |
| 6,408,251 B1 * | 6/2002 | Azuma | G01C 17/38 | 701/530 |
| 6,427,349 B1 * | 8/2002 | Blank | B60K 35/00 | 324/252 |
| 6,543,146 B2 * | 4/2003 | Smith | G01C 17/38 | 33/356 |
| 6,860,023 B2 * | 3/2005 | Manfred | G01C 17/38 | 324/244 |
| 7,146,740 B2 * | 12/2006 | Manfred | G01C 17/38 | 324/244 |
| 7,154,267 B2 * | 12/2006 | Withanawasam | G01C 17/38 | 324/244 |
| 7,266,452 B2 * | 9/2007 | Ockerse | G01C 17/28 | 701/530 |
| 7,451,549 B1 * | 11/2008 | Sodhi | G01C 17/38 | 33/356 |
| 7,587,277 B1 * | 9/2009 | Wells | G01C 21/165 | 701/510 |
| 7,891,103 B2 * | 2/2011 | Mayor | G01C 17/38 | 33/356 |
| 8,061,049 B2 * | 11/2011 | Mayor | G01C 17/38 | 33/356 |
| 8,108,171 B2 * | 1/2012 | Judd | G01C 17/38 | 324/246 |
| 8,209,140 B2 * | 6/2012 | Bailey | G01C 17/38 | 702/94 |
| 8,717,009 B2 * | 5/2014 | Tu | G01R 33/0035 | 324/202 |
| 2004/0123474 A1 * | 7/2004 | Manfred | G01C 17/38 | 33/352 |
| 2005/0138825 A1 * | 6/2005 | Manfred | G01C 17/38 | 33/356 |
| 2006/0152217 A1 * | 7/2006 | Withanawasam | G01C 17/38 | 324/244 |
| 2007/0163132 A1 * | 7/2007 | Parks | G01C 17/38 | 33/356 |
| 2007/0288166 A1 * | 12/2007 | Ockerse | G01C 17/28 | 701/530 |
| 2012/0086438 A1 * | 4/2012 | Tu | G01R 33/0035 | 324/202 |
| 2012/0101766 A1 * | 4/2012 | Snow | G01C 17/38 | 702/104 |
| 2012/0155770 A1 * | 6/2012 | Grzechnik | G01C 17/38 | 382/190 |
| 2012/0206129 A1 * | 8/2012 | Mahan | G01C 17/38 | 324/202 |
| 2013/0245984 A1 * | 9/2013 | Sheng | G01R 33/0035 | 702/94 |
| 2013/0345972 A1 * | 12/2013 | Askarpour | G01C 17/38 | 701/505 |
| 2014/0136135 A1 * | 5/2014 | Drukier | G01T 7/005 | 702/94 |

* cited by examiner

Hard Iron Calibration Flow Diagram
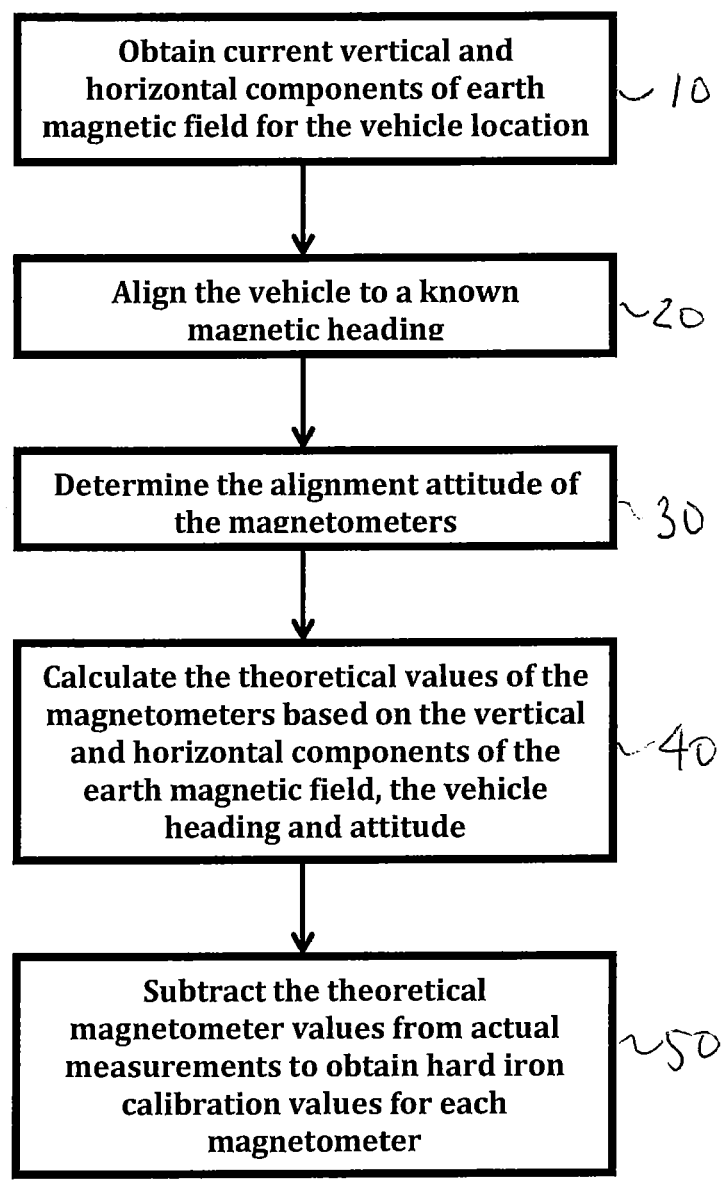

METHOD OF CALIBRATING A HEADING REFERENCE SYSTEM

CROSS-REFERENCE TO RELATED APPLICATIONS

This application claims the benefit and is a continuation application of U.S. patent application Ser. No. 13/833,513 filed on Mar. 15, 2013, which is incorporated herein by reference in its entirety.

FIELD OF THE INVENTION

The present invention relates to methods of calibrating heading reference systems on vehicles, such as attitude heading reference systems on aircraft or heading systems on ships, in which the magnetometer in such systems is calibrated using actual and theoretical readings at various magnetic headings of the vehicle.

BACKGROUND OF THE INVENTION

Typically, vehicles having a heading system, such as aircraft having an attitude and heading reference system, or AHRS, must be periodically calibrated to ensure a minimization of measurement errors due to such factors as hard iron disturbances of the aircraft, or other vehicle, such as a ship, having a heading system containing a magnetometer. Most such prior art calibration methods require numerous repositioning of the vehicles, such as the aircraft, such as eight or more different positions, to come up with an approximate calibration number. None of the prior art methods known to applicant utilize theoretical magnetic field properties of the Earth, such as theoretical values for horizontal and vertical intensity of the magnetic field at the location of the positioned vehicle, such as the aircraft on the tarmac, for comparison with actual magnetometer readings at such a position, thereby increasing the complexity of the calibration procedure and, potentially, affecting its accuracy. Examples of such prior art methods are disclosed in U.S. Pat. Nos. 7,587,277; 8,061,049; 7,891,103; 7,146,740; and 6,860,023, none of which use the theoretical magnetic components of the Earth's magnetic field, such as obtained from a web site, to calibrate the AHRS heading. By utilizing the calibration method of the present invention, this calibration procedure is significantly simplified and is an improvement over prior art methods.

SUMMARY OF PARTICULAR EMBODIMENTS OF THE INVENTION

The present invention is a method for calibrating a heading system installed in a vehicle, such as an aircraft AHRS or one installed onboard a ship, and which employs a magnetometer, by using the theoretical magnetic components of the Earth's magnetic field together with actual magnetometer readings, to calibrate the heading system.

In carrying out the method of the present invention, actual readings are obtained from the magnetometer at one or more headings for the vehicle, such as preferably at four different magnetic headings corresponding to North, South, East, and West, and a set of theoretical magnetic field properties of the Earth is also obtained at those locations, such as from a web site containing this information. These theoretical values comprise values for horizontal and vertical intensity of the magnetic field at each of these locations for the vehicle. A theoretical reading for the magnetometer at each of these headings is computed and then compared against the actual magnetometer readings at these same locations to obtain calibration values for the heading system. These calibration values are then utilized, such as by averaging all of the calibration values obtained, to provide a universal average gain and offset for the magnetometer, thus, universally calibrating the heading system with respect to measurement errors. This calibration method is preferably performed with the engine and avionics of the aircraft running, or corresponding equipment on the vehicle running. If desired, these calibrations values can be filtered through low pass filters to reduce any effects of noise.

Although as noted above the presently preferred calibration method can be accomplished at a single position of the vehicle, it has been found that the accuracy is preferably enhanced by doing it at the four directional headings of the compass; namely, North, South, East, and West.

BRIEF DESCRIPTION OF THE DRAWINGS

FIG. 1 is a diagrammatic illustration of a process flow diagram in accordance with the presently preferred method of the present invention.

DETAILED DESCRIPTION OF EMBODIMENTS OF THE INVENTION

Initially referring to FIG. 1, a process flow diagram of the presently preferred method of the present invention for calibrating a conventional vehicle heading system containing one or more magnetometers is shown. As illustrated by way of example in the process flow diagram of FIG. 1, and as will be explained in greater detail hereinafter, the current vertical and horizontal components of the Earth's magnetic field for the particular location of the vehicle, such as an aircraft or a ship, are obtained. This is represented by block 10 in FIG. 1. The vehicle is positioned or aligned to a known magnetic heading, as represented by block 20 in FIG. 1. The alignment attitude of the magnetometers is then determined, as represented by block 30 in FIG. 1. The theoretical values of the magnetometers is then calculated based on the vertical and horizontal components of the Earth's magnetic field, the vehicle heading and attitude, as represented by block 40 in FIG. 1. The theoretical magnetometer values are then subtracted from the actual measurements to obtain hard iron calibration values for each magnetometer in the heading system, as represented by block 50 in FIG. 1.

Typically, for example, in an attitude heading and reference system, or AHRS, on board an aircraft, the magnetic heading and pitch angle calibration of the AHRS is a very time consuming operation and is often limited to the geographic vicinity of the airport where the calibration was performed. That is not the case with the presently preferred method of the present invention which may be used, for example, with triaxial magnetometers aligned to the x, y, and z planes, or with two axis magnetometer arrangements, In either instance, a set of theoretical magnetic field properties of the Earth, such as preferably the theoretical values for horizontal intensity and vertical intensity of the magnetic field, at the location of the positioned vehicle is obtained. The information for these theoretical values may preferably be obtained from the web site http://www.ngdc.noaa.gov/geomagmodels/IGRFWMM.jsp. For example, an aircraft whose conventional AHRS is being calibrated, would preferably be positioned in a magnetically clean and flat area heading magnetic North with its engines and avionics running. Preferably the conventional magnetic calibration page of the AHRS would be accessed and the theoretical values obtained from the web site, including the total field as well as the horizontal and vertical intensity, would be entered on the magnetic calibration page and, for example, North Reading would be selected. To improve accuracy, this procedure can preferably be repeated for each of the other three normal magnetic headings, East, South, and West, by first positioning the vehicle to each of these headings, repeating the procedure, and selecting the corresponding Reading for that heading.

In this regard, it should be noted that the normal magnetometer readings without the presence of any hard iron effects are defined by the following equations for each of the four normal headings North, East, South and West:

(a) When heading North:

$$[xMag \ yMag \ zMag] = [HI \ 0 \ VI]$$
$$\begin{bmatrix} \cos\theta & \sin\theta\sin\phi & \sin\theta\cos\phi \\ 0 & \cos\phi & -\sin\phi \\ -\sin\theta & \cos\theta\sin\phi & \cos\theta\cos\phi \end{bmatrix}$$
$$= [HI\cos\theta - VI\sin\theta \ HI\sin\theta\sin\phi +$$
$$VI\cos\theta\sin\phi \ HI\sin\theta\cos\phi + VI\cos\theta\cos\phi]$$

(b) When heading East:

$$[xMag \ yMag \ zMag] = [0 \ HI \ VI]$$
$$\begin{bmatrix} \cos\theta & \sin\theta\sin\phi & \sin\theta\cos\phi \\ 0 & \cos\phi & -\sin\phi \\ -\sin\theta & \cos\theta\sin\phi & \cos\theta\cos\phi \end{bmatrix}$$
$$= [-VI\sin\theta \ HI\cos\phi + VI\cos\theta\sin\phi -$$
$$HI\sin\phi + VI\cos\theta\cos\phi]$$

(c) When heading South:

$$[xMag \ yMag \ zMag] = [-HI \ 0 \ VI]$$
$$\begin{bmatrix} \cos\theta & \sin\theta\sin\phi & \sin\theta\cos\phi \\ 0 & \cos\phi & -\sin\phi \\ -\sin\theta & \cos\theta\sin\phi & \cos\theta\cos\phi \end{bmatrix}$$
$$= [-HI\cos\theta - VI\sin\theta \ -HI\sin\theta\sin\phi +$$
$$VI\cos\theta\sin\phi - HI\sin\theta\sin\phi +$$
$$VI\cos\theta\cos\phi]$$

(d) When heading West:

$$[xMag \ yMag \ zMag] = [0 \ -HI \ VI]$$
$$\begin{bmatrix} \cos\theta & \sin\theta\sin\phi & \sin\theta\cos\phi \\ 0 & \cos\phi & -\sin\phi \\ -\sin\theta & \cos\theta\sin\phi & \cos\theta\cos\phi \end{bmatrix}$$
$$= [-VI\sin\theta \ -HI\cos\phi + VI\cos\theta\sin\phi -$$
$$HI\sin\phi + VI\cos\theta\cos\phi]$$

Where:
HI Horizontal intensity of the local magnetic field;
VI Vertical intensity of the local magnetic field;
$\theta$ Aircraft pitch angle;
$\phi$ Aircraft bank angle;
$\psi$ Aircraft magnetic heading;
xMag=$X_b$ x-axis magnetometer reading;
yMag=$Y_b$ y-axis magnetometer reading;
zMag=$Z_b$ z-axis magnetometer reading.

The deviation from the above values is referred to as the hard iron offset of the unit being calibrated and, in accordance with the presently preferred method, will be subtracted from the magnetometer readings resulting in the following equation for the corrected heading:

$$\psi = \tan^{-1}\left(\frac{Y_s}{X_s}\right)$$

Where:

$X_s = X_b \cos\theta + Y_b \sin\theta \sin\chi + Z_b \sin\theta \cos\Phi$ $Y_s = Y_b \cos\Phi Z_b \sin\Phi$ $Z_s = X_b \sin\theta - Y_b \cos\theta \sin\Phi - Z_b \cos\theta \cos\Phi$ Thus, summarizing the above presently preferred method for calibrating a heading system installed in a vehicle, actual readings are obtained from one or more magnetometers at one or more headings for the vehicle, such as preferably at the four different magnetic headings corresponding to North, South, East, and West, and a set of theoretical magnetic field properties of the Earth is also obtained at those same locations, such as from a web site containing this information. These theoretical values include values for the horizontal and vertical intensity of the magnetic field at each of these locations for the vehicle as well as the total field. A theoretical reading for the magnetometer at each of these headings is computed and then compared against the actual magnetometer readings at these same locations to obtain calibration values for the heading system. These calibration values are then utilized, such as by averaging all of the calibration values obtained, to provide a universal average gain and offset for the magnetometer, thus, universally calibrating the heading system with respect to measurement errors. This calibration method is preferably performed with the engine and avionics of the aircraft running, or corresponding equipment on the vehicle running. If desired, these calibration values can be filtered through low pass filters to reduce any effects of noise.

Although the presently preferred calibration method can be accomplished at a single position of the vehicle, it has been found that the accuracy is preferably enhanced by doing it at the four normal directional headings of the compass; namely, North, South, East, and West.

What is claimed is:

1. A method for calibrating an aircraft attitude and reference heading system comprising at least one magnetometer, the method comprising the steps of:
   selectively positioning an aircraft on the ground along the Earth's surface;
   obtaining an actual reading from the at least one magnetometer at a selected magnetic heading for the positioned aircraft while the aircraft is stationary on the ground;
   obtaining a set of theoretical magnetic field properties of the Earth at a location of the positioned aircraft, the obtained theoretical magnetic field properties comprising theoretical values for a horizontal intensity and a vertical intensity of the magnetic field at the location of the positioned aircraft;

computing a theoretical reading for the at least one magnetometer at the selected magnetic heading of the positioned aircraft based on at least the magnetic heading, the associated attitude for the positioned aircraft, and the obtained theoretical values for the magnetic field at the location of the positioned aircraft;

comparing the obtained actual reading from the at least one magnetometer for the positioned aircraft at the magnetic heading with the obtained theoretical magnetometer reading at the magnetic heading for providing a calibration value for the heading system at the magnetic heading for the positioned aircraft;

utilizing the provided calibration value at the magnetic heading of the aircraft to calculate a universal average gain and offset for the at least one magnetometer; and utilizing the universal average gain and offset to universally calibrate the heading system with respect to measurement errors.

2. The method of claim 1 wherein the selected magnetic heading for the aircraft the is selected from the group consisting of North, South, East, and West magnetic headings for the aircraft.

3. The method of claim 1 wherein the at least one magnetometer comprises a triaxial magnetometer.

4. The method of claim 1 wherein the step of obtaining the set of theoretical magnetic field properties further comprises obtaining the set from an organization that provides access to geophysical data.

5. The method of claim 1 wherein the aircraft has an associated engine and avionics, the calibration method being performed with the aircraft engine and avionics running.

6. The method of claim 1 wherein the at least one magnetometer comprises a triaxial magnetometer and the equation for the aircraft magnetic heading is:

$$\psi = -\tan^{-1}\left(\frac{Y_\theta}{X_\theta}\right)$$

Where:

$Y_\theta = yMag \cos \phi - zMag \sin \phi$ $X_\theta = xMag \cos \theta + yMag \sin \theta \sin \phi + zMag \sin \theta \cos \phi$.

7. A method for calibrating a heading system for a vehicle comprising at least one magnetometer, the method comprising the steps of:

selectively positioning the vehicle along the Earth's surface;

obtaining an actual reading from the at least one magnetometer at a selected first magnetic heading for the positioned vehicle while the vehicle is stationary on the Earth's surface;

obtaining a set of theoretical magnetic field properties of the Earth at a location of the positioned vehicle, the obtained theoretical magnetic field properties comprising theoretical values for a horizontal intensity and a vertical intensity of the magnetic field at the location of the positioned vehicle;

computing a theoretical reading for the magnetometer at the selected magnetic heading of the positioned vehicle based on at least the magnetic heading, and the obtained theoretical values for the magnetic field at the location of the positioned vehicle;

comparing the obtained actual reading from the at least one magnetometer for the positioned vehicle at the selected magnetic heading with the obtained theoretical magnetometer reading at the first magnetic heading for providing a first calibration value for the heading system at the selected magnetic heading for the positioned vehicle;

utilizing the provided calibration value at the magnetic heading of the vehicle to calculate a universal average gain and offset for the at least one magnetometer; and utilizing the universal average gain and offset to universally calibrate the heading system with respect to measurement errors.

8. The method of claim 7 wherein the vehicle is a ship positioned in water along the Earth's surface.

9. The method of claim 7 wherein the selected magnetic heading for the vehicle is selected from the group consisting of North, South, East, and West magnetic headings for the aircraft.

* * * * *